United States Patent
Park (10) Patent No.: US 7,515,225 B2
(45) Date of Patent: Apr. 7, 2009

(54) SUBSTRATE FOR A LIQUID CRYSTAL DISPLAY AND A FABRICATING METHOD THEREOF

(75) Inventor: Jong-Jin Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 392 days.

(21) Appl. No.: 11/011,066

(22) Filed: Dec. 15, 2004

(65) Prior Publication Data

US 2005/0134788 A1    Jun. 23, 2005

(30) Foreign Application Priority Data

Dec. 23, 2003    (KR) ...................... 10-2003-0095717

(51) Int. Cl.
*G02F 1/1335*    (2006.01)
*G02F 1/1343*    (2006.01)

(52) U.S. Cl. ....................................... 349/106; 349/144

(58) Field of Classification Search ......... 349/106–109, 349/110, 139, 143–144, 158

See application file for complete search history.

(56) References Cited

U.S. PATENT DOCUMENTS 5,757,452 A * 5/1998 Masaki et al. ............... 349/110
2005/0122445 A1* 6/2005 Park et al. .................. 349/106

FOREIGN PATENT DOCUMENTS

JP    11-295717    10/1999
JP    03-200217    9/2001

* cited by examiner

*Primary Examiner*—Dung T. Nguyen
(74) *Attorney, Agent, or Firm*—McKenna Long & Aldridge LLP (57) ABSTRACT

A substrate for a liquid crystal display includes a black matrix on a substrate having first, second, third and fourth sub-pixel regions, wherein the black matrix includes first, second, third and fourth openings corresponding to the first, second, third and fourth sub-pixel regions, respectively, first, second and third color filter patterns corresponding to the first, second and third openings, respectively, a first planarization layer on the first, second and third color filter patterns and filling the fourth opening, and a second planarization layer on the first planarization layer.

12 Claims, 14 Drawing Sheets

SUBSTRATE FOR A LIQUID CRYSTAL DISPLAY AND A FABRICATING METHOD THEREOF

The application claims the benefit of Korean Patent Application No. 2003-95717, filed on Dec. 23, 2003, which is hereby incorporated by reference for all purposes as if fully set forth herein.

BACKGROUND OF THE INVENTION

1. Field of the Invention

The present invention relates to a liquid crystal display (LCD), and more particularly, to a color filter substrate for an LCD and a fabricating method thereof.

2. Discussion of the Related Art

Until recently, display devices generally employed cathode-ray tubes (CRTs). Presently, many efforts are being made to study and develop various types of flat panel displays, such as liquid crystal displays (LCDs), plasma display panels (PDPs), field emission displays (FEDs), and electro-luminescence displays (ELDs), as substitutions for CRTs.

Of these flat panel displays, the LCD has high resolution images, lightness, thin profile, compact size, and low voltage power supply requirements.

Figure 1:
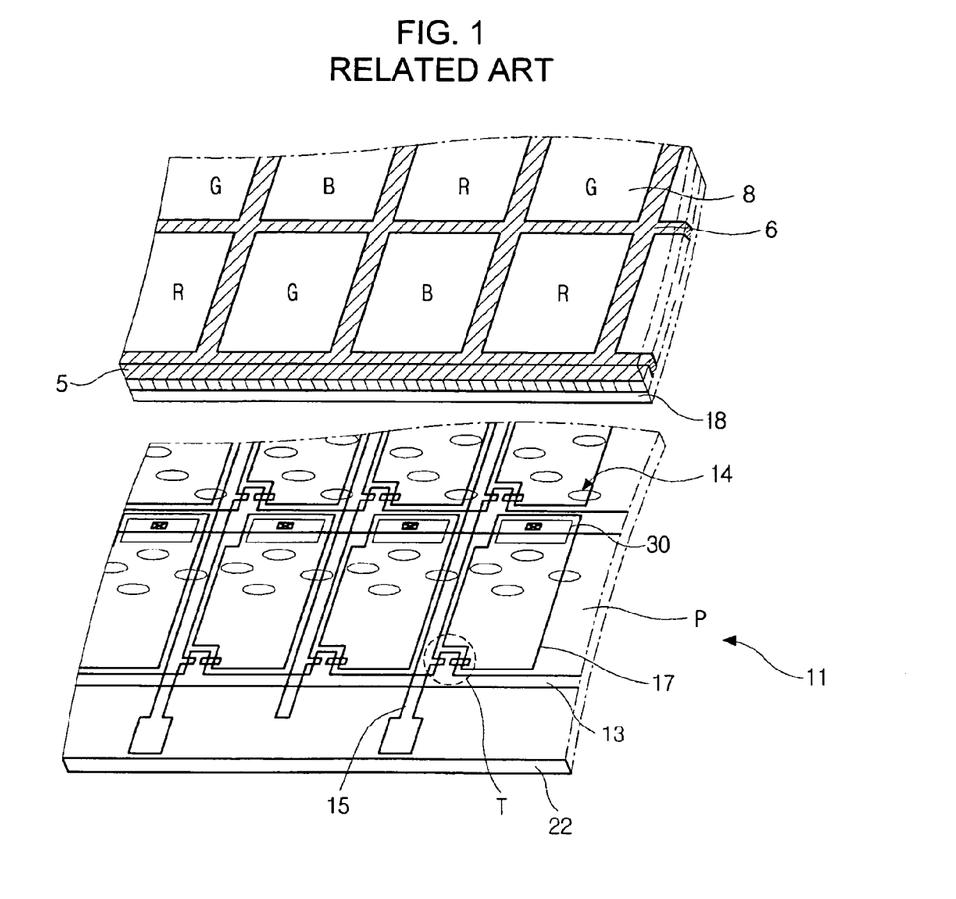
FIG. 1 is a schematic view of an LCD according to the related art.

FIG. 1 is a schematic view of an LCD according to the related art.

In FIG. 1, an LCD 11 includes a color filter substrate 5, an array substrate 22, and a liquid crystal layer 14 interposed between the two substrates 5 and 22.

The array substrate 22 as a lower substrate includes a data line 15 and a gate line 13 to define a sub-pixel region P, a pixel electrode 17 and a thin film transistor T as a switching element in the sub-pixel region P.

The color filter substrate 5 as an upper substrate includes red, green and blue color filter patterns 8 (R, G and B) corresponding to the respective sub-pixel regions P to display red, green and blue colors, respectively, a black matrix 6 between the adjacent color filter patterns 8, and a common electrode 18 on the color filter pattern 8 and the black matrix 6.

In the LCD of FIG. 1, red, green and blue sub-pixels, which have red, green and blue color filter patterns R, G and B, respectively, constitute one pixel to display color images.

Figure 2:
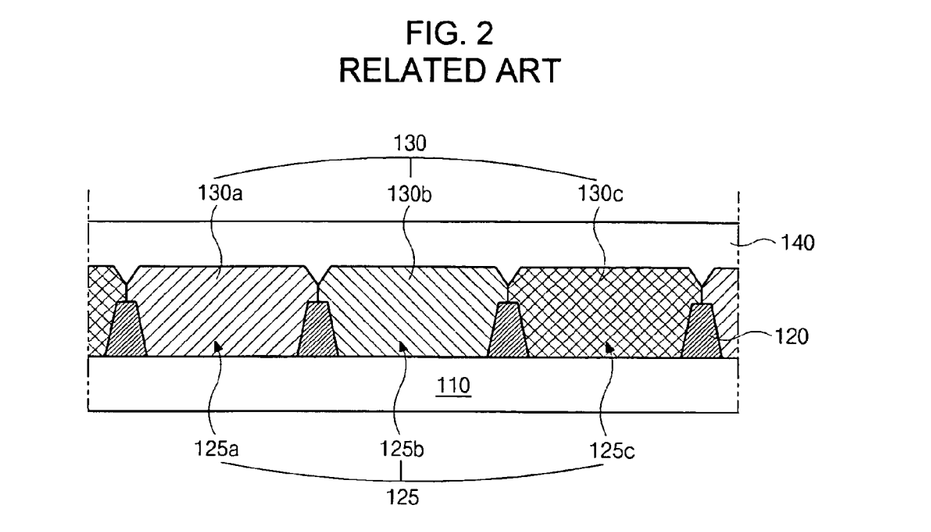
FIG. 2 is a cross-sectional view of an RGB color filter substrate for an LCD according to the related art.

FIG. 2 is a cross-sectional view of an RGB color filter substrate for an LCD according to the related art.

In FIG. 2, an RGB color filter substrate includes red, green and blue color filter patterns 130a, 130b and 130c, and further includes a black matrix 120 having first, second and third opening 125a, 125b and 125c corresponding to the red, green and blue color filter patterns 130a, 130b and 130c. A planarization layer 140 is disposed on the color filter pattern 130 to planarize the RGB color filter substrate.

Recently, to increase brightness of displayed images, the color filter substrate includes a white color filter pattern as well as red, green and blue color filter patterns.

Figure 3:
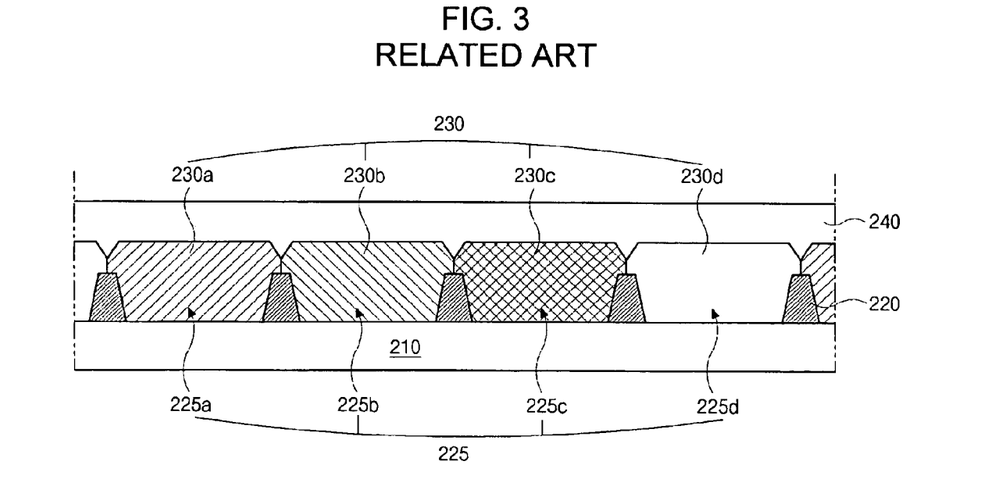
FIG. 3 is a cross-sectional view of an RGBW color filter substrate for an LCD according to the related art.

FIG. 3 is a cross-sectional view of an RGBW color filter substrate for an LCD according to the related art.

In FIG. 3, the RGBW color filter substrate includes red, green and blue color filter patterns 230a, 230b and 230c like the RGB color filter substrate of FIG. 2, and further includes a white color filter pattern 230d.

FIGS. 4A to 4G are cross-sectional views of a fabricating method of an RGBW color filter substrate for an LCD according to the related art.

Figure 4A:
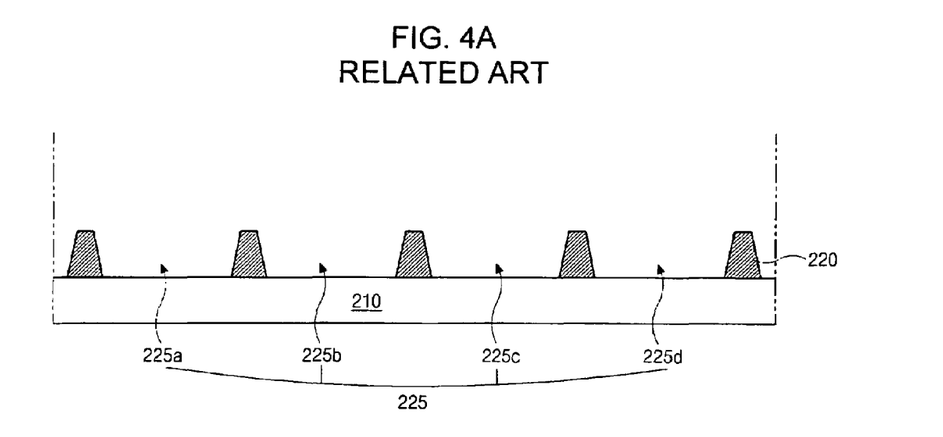
FIGS. 4A to 4G are cross-sectional views of a fabricating method of an RGBW color filter substrate for an LCD according to the related art.

In FIG. 4A, a light-shielding material is deposited on a substrate 210 and patterned to form a black matrix 220. The black matrix 220 includes first, second, third and fourth openings 225a, 225b, 225c and 225d corresponding to respective sub-pixel regions.

Figure 4B:
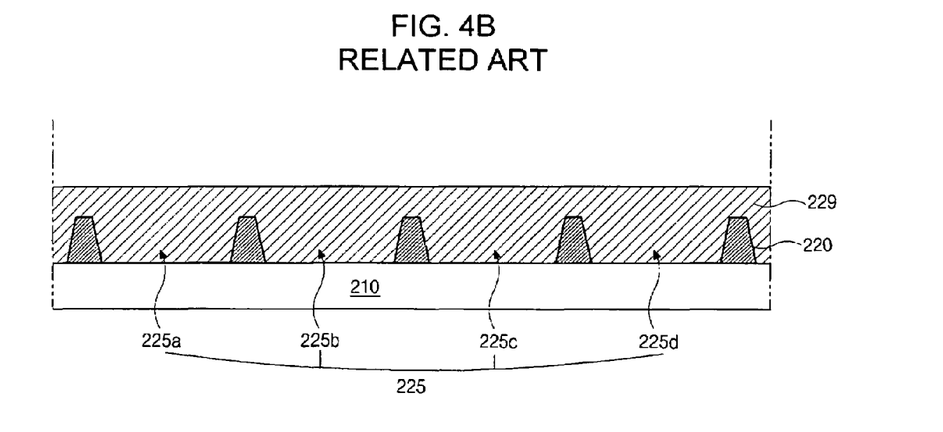

In FIG. 4B, a red color resin 229 is deposited on the substrate 210 having the black matrix 220.

Figure 4C:
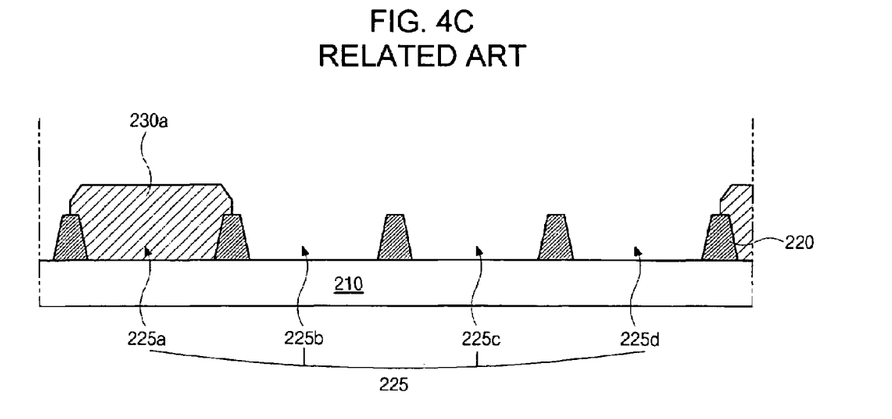

In FIG. 4C, the red color resin 229 (in FIG. 4B) is patterned to form a red color filter pattern 230a in the first opening 225a.

Figure 4D:
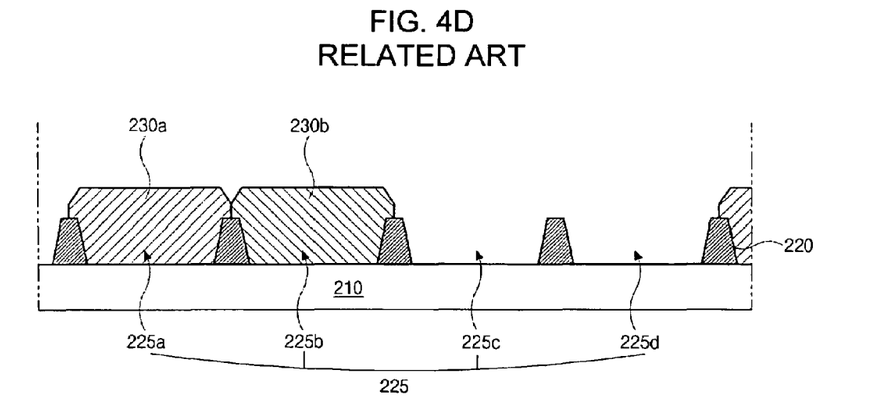

In FIG. 4D, a green color resin is deposited on the substrate 210 having the red color filter pattern 230a and patterned to form a green color filter pattern 230b in the second opening 225b. In other words, the green color filter pattern 230b is formed in a similar method of forming the red color filter pattern 230a.

Figure 4E:
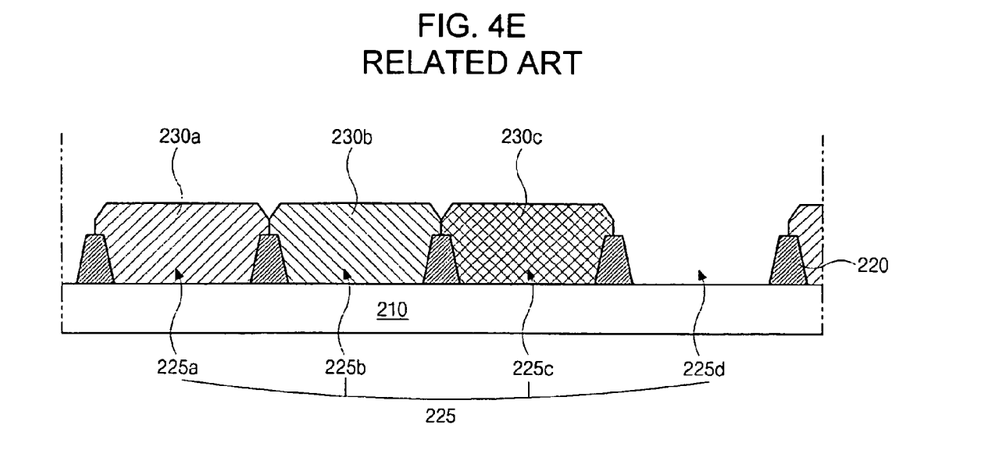
Figure 4F:
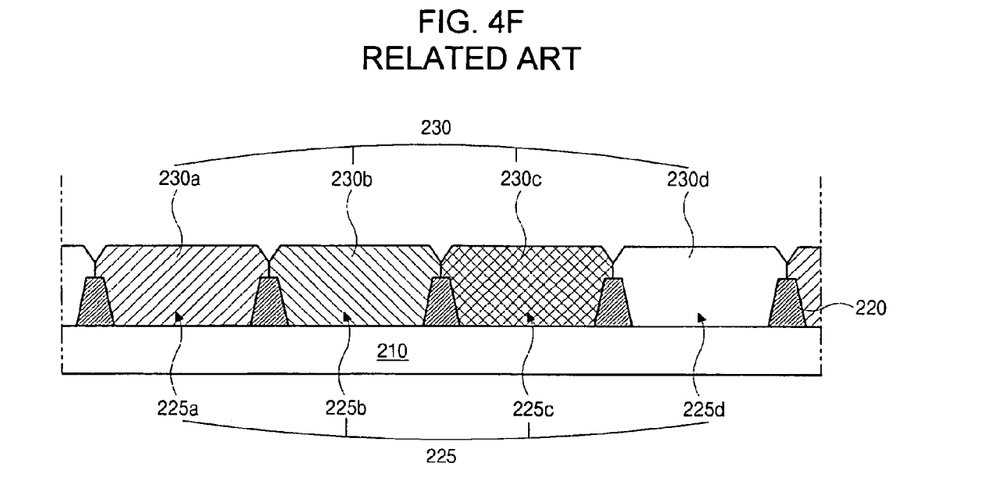

In FIGS. 4E and 4F, blue and white color filter patterns 230c and 230d are formed in the third and fourth openings 225c and 225d in a similar method of forming the red and green color filter patterns 230a and 230b.

Figure 4G:
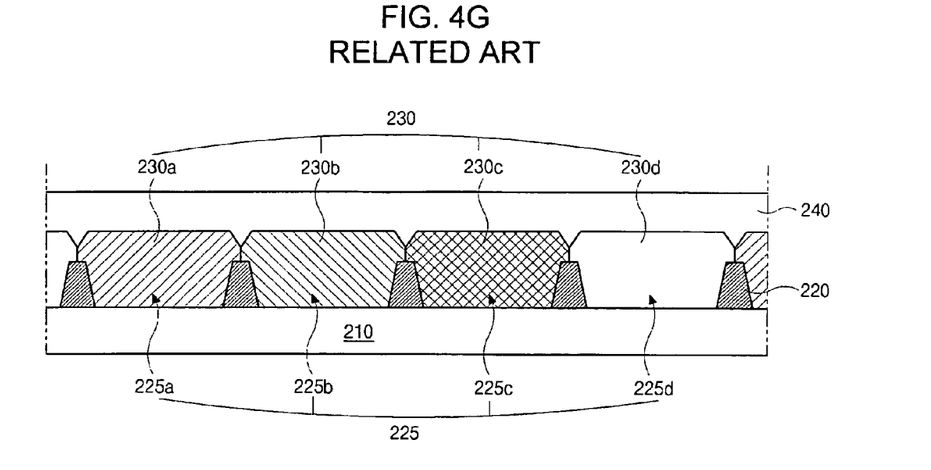

In FIG. 4G, a planarization layer 240 is formed on the color filter pattern 230.

In the fabricating method of the related art RGBW color filter substrate, since the RGBW color filter substrate includes the white color filter pattern, in addition to patterning processes to form red, green and blue color filter patterns, a patterning process is needed to form the white color filter pattern. Therefore, processes and costs to fabricate the color filter substrate increase.

SUMMARY OF THE INVENTION

Accordingly, the present invention is directed to a substrate for a liquid crystal display and a fabricating method thereof that substantially obviates one or more of the problems due to limitations and disadvantages of the related art.

An advantage of the present invention is to provide a substrate for a liquid crystal display and a fabricating method thereof that can reduce fabrication processes and costs.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a substrate for a liquid crystal display includes a black matrix on a substrate having first, second, third and fourth sub-pixel regions, wherein the black matrix includes first, second, third and fourth openings corresponding to the first, second, third and fourth sub-pixel regions, respectively, first, second and third color filter patterns corresponding to the first, second and third openings, respectively, a first planarization layer on the first, second and third color filter patterns and filling the fourth opening, and a second planarization layer on the first planarization layer.

In another aspect of the present invention, a substrate for a liquid crystal display (LCD) includes a black matrix on a substrate having first, second, third and fourth sub-pixel regions, wherein the black matrix includes first, second, third and fourth openings corresponding to the first, second, third and fourth sub-pixel regions, respectively, at least one dummy pattern in the fourth opening, first, second and third color filter patterns corresponding to the first, second and third openings, respectively, and a planarization layer on the first, second and third color filter patterns and filling the fourth opening.

In yet another aspect of the present invention, a fabricating method of a substrate for a liquid crystal display (LCD) includes forming a black matrix on a substrate having first, second, third and fourth sub-pixel regions, wherein the black matrix includes first, second, third and fourth openings corresponding to the first, second, third and fourth sub-pixel regions, respectively, forming first, second and third color filter patterns corresponding to the first, second and third openings, respectively, forming a first planarization layer on the first, second and third color filter patterns, the first planarization layer filling the fourth opening, and forming a second planarization layer on the first planarization layer.

In still another aspect of the present invention, a fabricating method of a substrate for a liquid crystal display (LCD) includes forming a black matrix on a substrate having first, second, third and fourth sub-pixel regions, wherein the black matrix includes first, second, third and fourth openings corresponding to the first, second, third and fourth sub-pixel regions, respectively, forming at least one dummy pattern in the fourth opening, forming first, second and third color filter patterns corresponding to the first, second and third openings, respectively, and forming a planarization layer on the first, second and third color filter patterns, the planarization layer filling the fourth opening.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

First Embodiment

Figure 5:
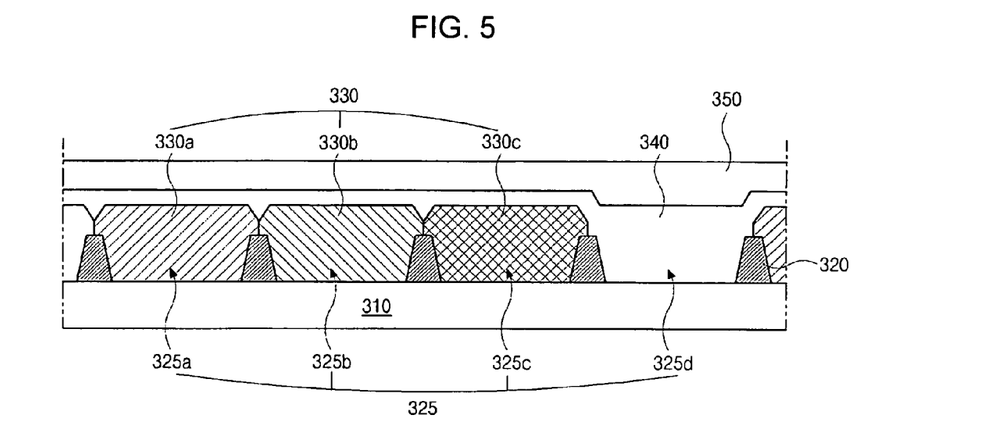
FIG. 5 is a cross-sectional view of an RGBW color filter substrate for a liquid crystal display (LCD) according to a first embodiment of the present invention.

FIG. 5 is a cross-sectional view of an RGBW color filter substrate for a liquid crystal display (LCD) according to a first embodiment of the present invention.

In FIG. 5, an RGBW color filter substrate includes a black matrix 320 having a opening 325, a color filter pattern 330, and first and second planarization layers 340 and 350.

The black matrix 320 is made of light-shielding material, and corresponds to array patterns such as a thin film transistor, a data line and a gate line in an array substrate to prevent emission of an abnormal light. The opening 325 corresponds to each sub-pixel region defined by a gate line and a data line crossing each other. The opening 325 includes first, second, third and fourth openings 325a, 325b, 325c and 325d corresponding to the respective sub-pixel regions, i.e. red, green, blue and white sub-pixel regions, respectively.

The color filter pattern 330 includes red, green and blue color filter patterns 330a, 330b and 330c in the first, second and third openings 325a, 325b and 325c, respectively.

The first planarization layer 340 is disposed on the color filter pattern 330 and fills the fourth opening 325d, and the second planarization layer 350 is disposed on the first planarization layer 340. The first and second planarization layers 340 and 350 planarize the RGBW substrate. Additionally, the first and second planarization layers 340 and 350 corresponding to the fourth opening 325d acts as a white color filter pattern to display white color.

Since a separate color filter pattern is not disposed in the fourth opening 325d, a surface of the first planarization layer 340 corresponding to the fourth opening 325d may be lower than that corresponding to the color filter pattern 330, and a thickness of the first planarization layer 340 corresponding to the fourth opening 325d may be thicker than that corresponding to the color filter pattern 330. A surface of the second planarization layer 350 corresponding to the fourth opening 325d may be substantially equal to that corresponding to the color filter pattern 330, and a thickness of the second planarization layer 350 corresponding to the fourth opening 325d may be thicker than that corresponding to the color filter pattern 330. Accordingly, the first and second planarization layers 340 and 350 act as a white color filter pattern as well as a layer to planarize the RGBW color filter substrate. Since the first and second planarization layers 340 and 350 act as a white color filter pattern, the first and second planarization layers 340 and 350 may be made of transparent material such as organic material including acrylic.

FIGS. 6A to 6G are cross-sectional views of a fabricating method of an RGBW color filter substrate for an LCD according to the first embodiment of the present invention.

Figure 6A:
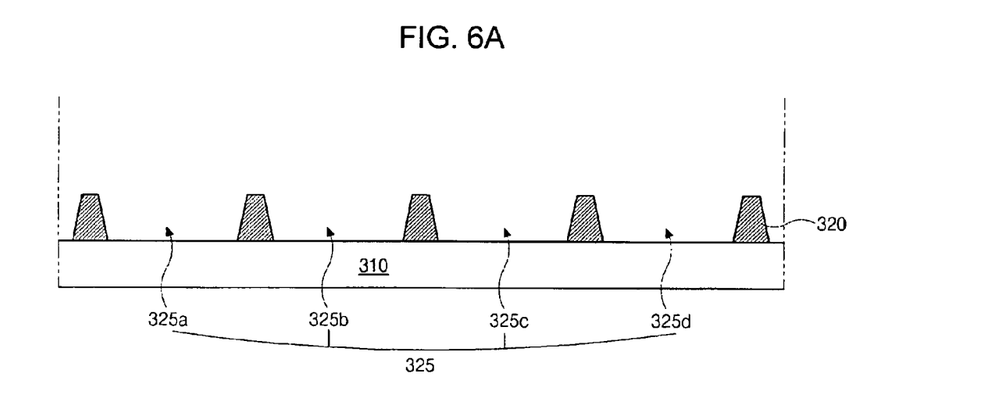
FIGS. 6A to 6G are cross-sectional views of a fabricating method of an RGBW color filter substrate for an LCD according to the first embodiment of the present invention.

In FIG. 6A, a light-shielding material is deposited on a substrate 310 and patterned to form a black matrix 320. The black matrix 320 includes first, second, third and fourth openings 325a, 325b, 325c and 325d corresponding to red, green, blue and white sub-pixel regions, respectively.

Figure 6B:
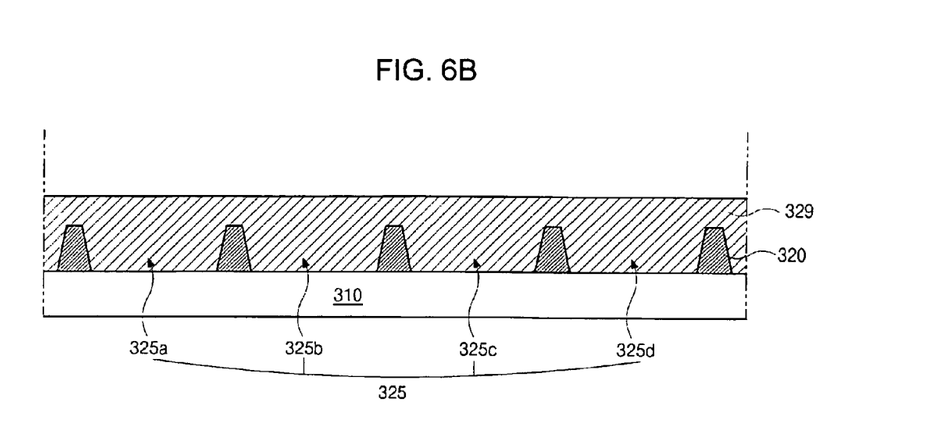

In FIG. 6B, a red color resin 329 is deposited on the substrate 310 having the black matrix 320. The red color resin 329 is optical-sensitive material.

Figure 6C:
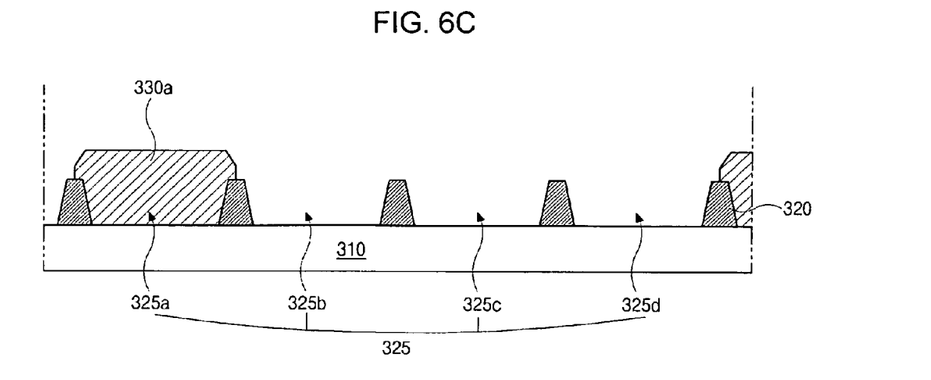

In FIG. 6C, the red color resin 329 (in FIG. 6B) is patterned to form a red color filter pattern 330a in the first opening 325a. Since the red color resin is optical-sensitive material, a photoresist needs not in photolithography to pattern the red color resin. In the patterning process for the red color pattern 330a, a red color resin is exposed on a light with a photo-mask having a light-transmission portion and a light-blocking portion. When the red color resin is a positive-type resin, a light-exposed portion of which is removed, the light-blocking portion of the photo-mask corresponds to the first opening 325a. On the contrary, when the red color resin is a negative-type resin, a light-exposed portion of which remains, the light-transmission portion of the photo-mask corresponds to the first opening 325a.

Figure 6D:
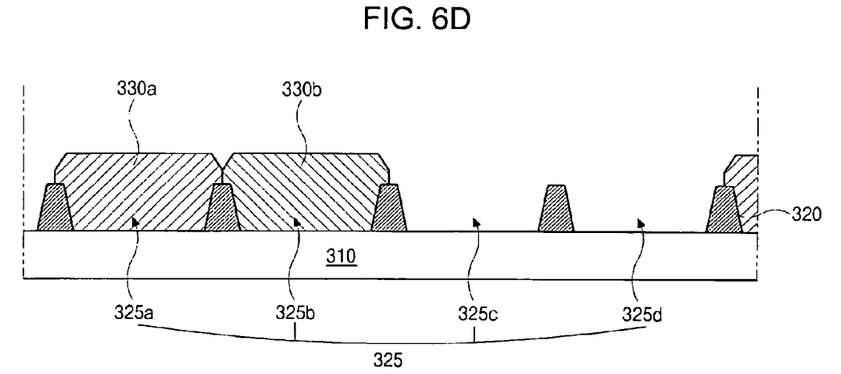

In FIG. 6D, a green color resin is deposited on the substrate 310 having the red color filter pattern 330a and patterned to form a green color filter pattern 330b in the second opening 325b. In other words, the green color filter pattern 330b is formed in a similar method of forming the red color filter pattern 330a.

Figure 6E:
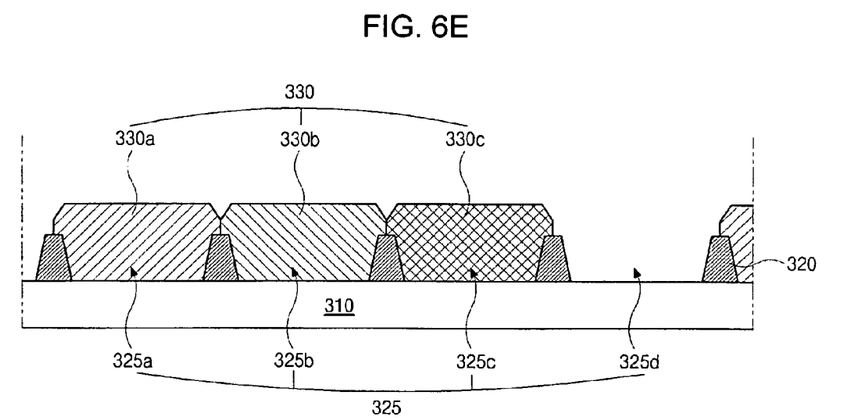

In FIG. 6E, blue color filter pattern 330c is formed in the third opening 325c in a similar method of forming the red and green color filter patterns 330a and 330b.

Figure 6F:
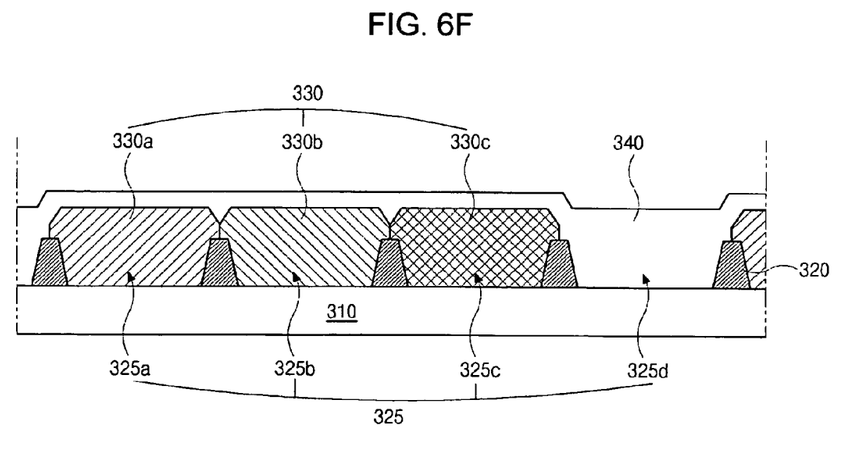

In FIG. 6F, a first planarization layer 340 is formed on the color filter pattern 330, and fills the fourth opening 325d. The first planarization layer 340 may be cured after deposited.

Figure 6G:
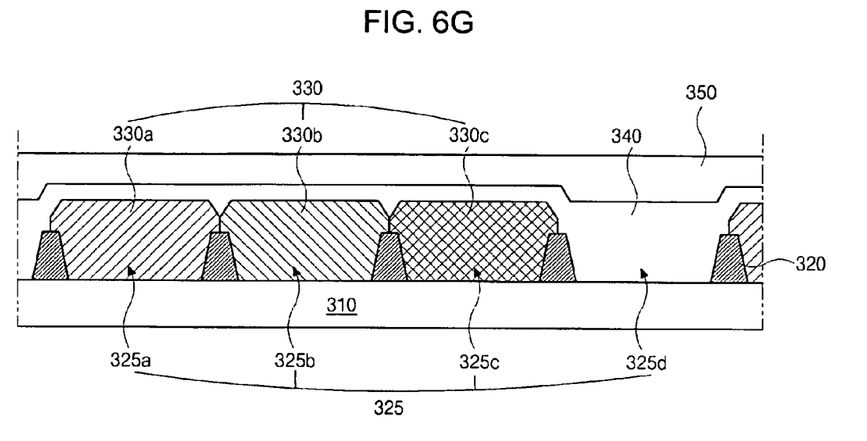

In FIG. 6G, a second planarization layer 350 is formed on the first planarization layer 340. The second planarization layer 350 may be cured after deposited.

In the first embodiment of the present invention, instead of a white color filter pattern, first and second planarization layers are used. Accordingly, the patterning process to form a white color filter pattern can be removed. Therefore, processes and costs to fabricate the color filter substrate can be reduced.

Second Embodiment

Figure 7:
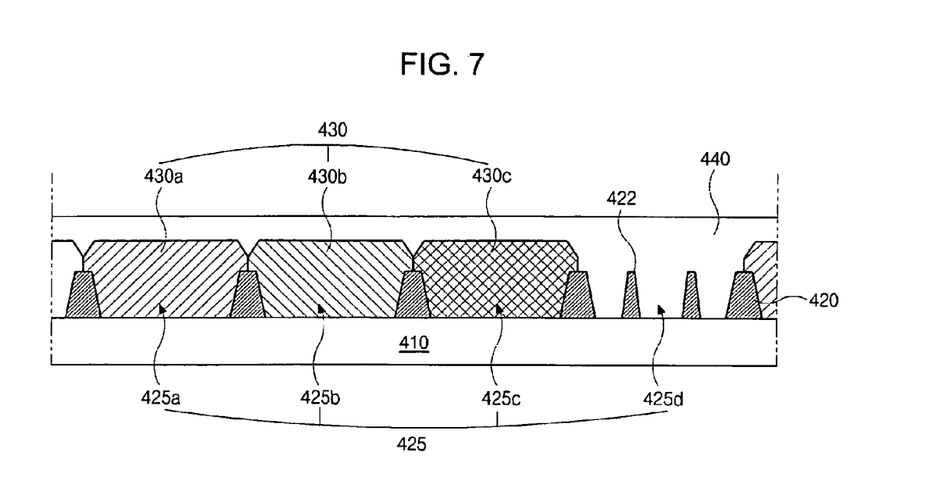
FIG. 7 is a cross-sectional view of an RGBW color filter substrate for an LCD according to a second embodiment of the present invention.

FIG. 7 is a cross-sectional view of an RGBW color filter substrate for an LCD according to a second embodiment of the present invention.

An RGBW color filter substrate in FIG. 7 is similar to that in FIG. 5, except for structures in the fourth opening corresponding to the white sub-pixel region. In the second embodiment, explanations of the similar parts to the first embodiment will be omitted.

In FIG. 7, the RGBW color filter substrate includes a color filter pattern 430 like that in FIG. 5. However, the RGBW color filter substrate of a second embodiment includes at least one dummy pattern 422 in a fourth opening 425d, and one planarization layer 440 instead of the two planarization layers in the first embodiment.

Since the dummy pattern 422 is disposed in the fourth opening 425d, the fourth opening 425d has a smaller volume than each of other openings 425a, 425b and 425c. Accordingly, instead of the two planarization layers in the first embodiment, the one planarization layer 440 may planarize the RGBW color filter substrate. To fill portions of the fourth opening 425d, the dummy pattern 422 may have a thin and thick shape such as a column. The dummy pattern 422 may be made of the same material as a black matrix 420. The dummy pattern 422 may have a width thinner than the black matrix 420. Accordingly, a surface of the planarization layer 440 corresponding to the fourth opening 425d may be substantially equal to that corresponding to the color filter pattern 430, and a thickness of the second planarization layer 440 corresponding to the fourth opening 425d may be thicker than that corresponding to the color filter pattern 430

FIGS. 8A to 8F are cross-sectional views of a fabricating method of an RGBW color filter substrate for an LCD according to the second embodiment of the present invention. A fabricating method of the second embodiment is similar to that of the first embodiment, except for structures in the fourth opening corresponding to the white sub-pixel region.

Figure 8A:
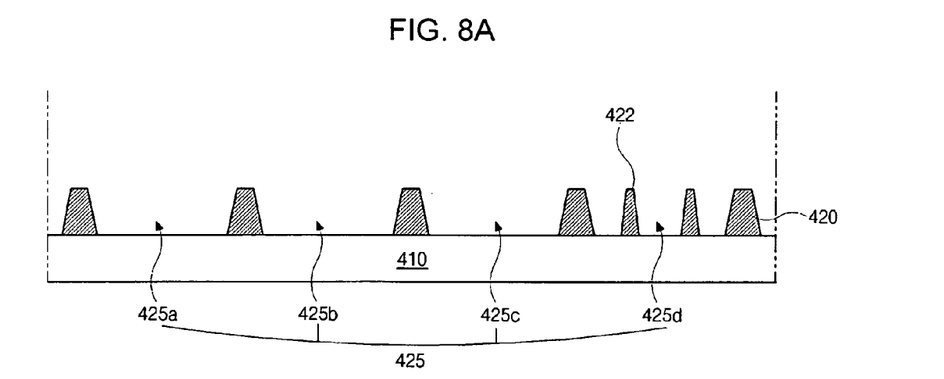
FIGS. 8A to 8F are cross-sectional views of a fabricating method of an RGBW color filter substrate for an LCD according to the second embodiment of the present invention.
Figure 8B:
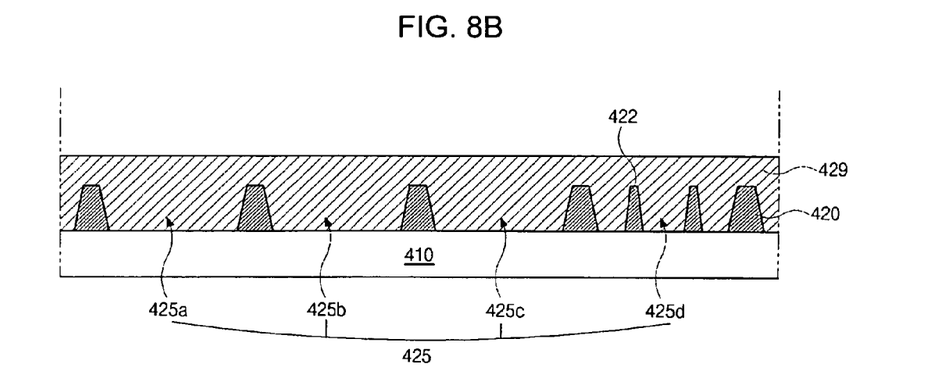
Figure 8C:
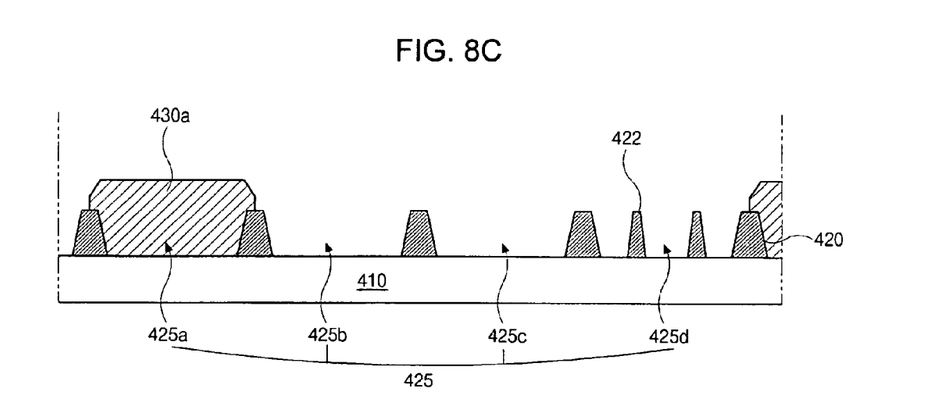
Figure 8D:
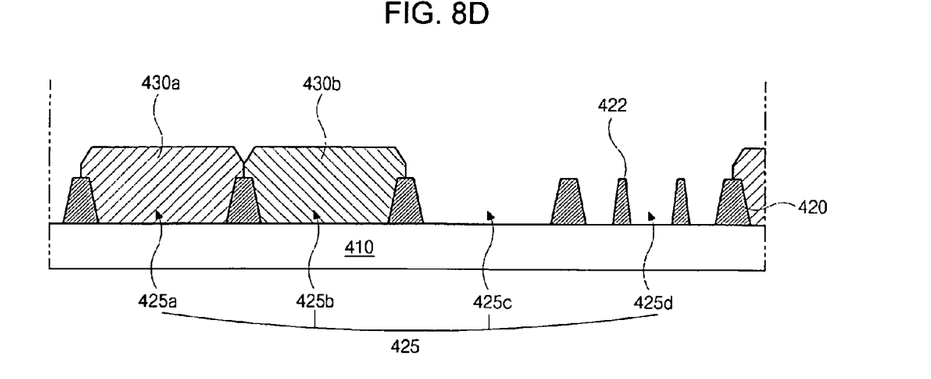
Figure 8E:
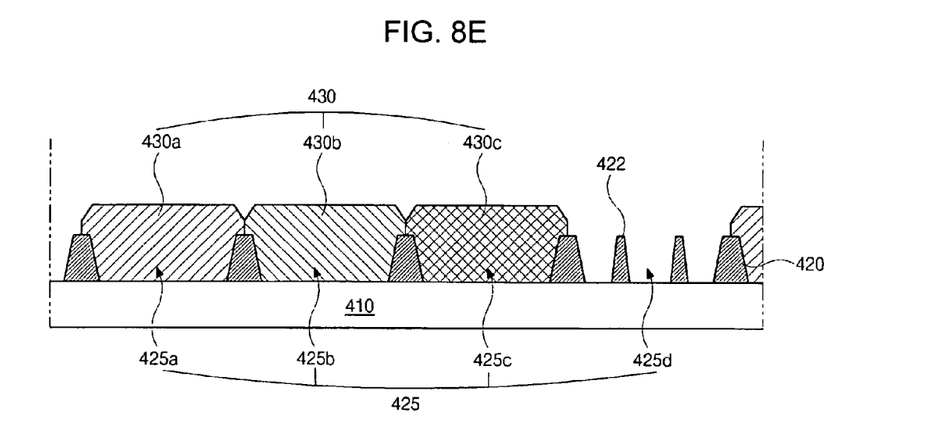

In FIG. 8A, a light-shielding material is deposited on a substrate 410 and patterned to form a black matrix 420 and at least one dummy pattern 422. The black matrix 420 includes first, second, third and fourth openings 425a, 425b, 425c and 425d corresponding to red, green, blue and white sub-pixel regions, respectively, and the dummy pattern 422 is disposed in the fourth opening 425d.

In FIGS. 8B to 8E, in a method similar to the first embodiment, red, green and blue color filter patterns 430a, 430b and 430c are formed in the first, second and third openings 425a, 425b and 425c, respectively.

Figure 8F:
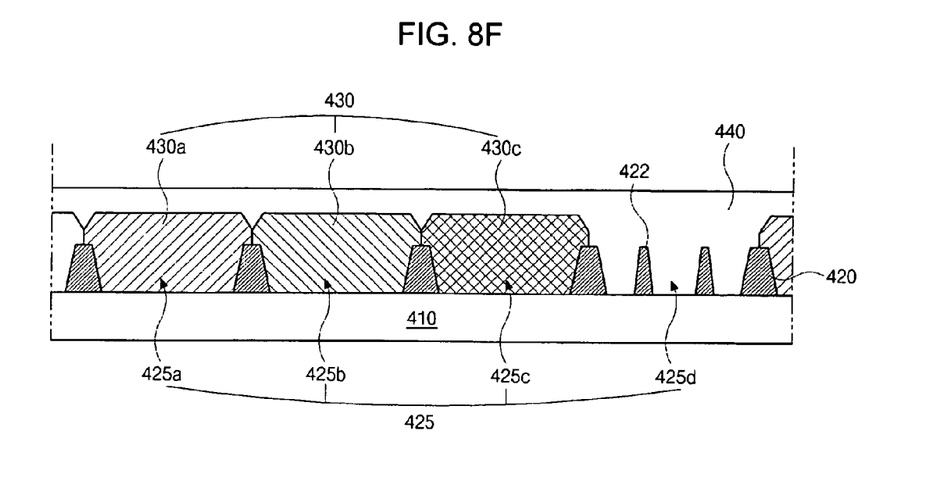

In FIG. 8F, a planarization layer 440 is formed on the color filter pattern 430 to planarize the color filter pattern 430, and fills the fourth opening 425d having the dummy pattern 422.

In the second embodiment of the present invention, instead of a white color filter pattern, a dummy pattern is employed in the same process of forming the black matrix, and thus one planarization layer is enough to planarize the RGBW color filter substrate. Accordingly, patterning process to form a white color filter pattern can be removed. Therefore, processes and costs to fabricate the color filter substrate can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A substrate for a liquid crystal display (LCD), comprising:
    a black matrix on a substrate having first, second, third and fourth sub-pixel regions, wherein the black matrix includes first, second, third and fourth openings corresponding to the first, second, third and fourth sub-pixel regions, respectively;
    at least one dummy pattern in the fourth opening, wherein the at least one dummy pattern is made of the same material as the black matrix;
    first, second and third color filter patterns corresponding to the first, second and third openings, respectively; and
    a planarization layer on the first, second and third color filter patterns and filling the fourth opening,
    wherein a total area of the dummy pattern is smaller than an area of the fourth opening excluding the dummy pattern.

2. The substrate according to claim 1, wherein a surface of the planarization layer corresponding to the fourth opening is substantially equal to a surface of the planarization layer corresponding to the first, second and third openings.

3. The substrate according to claim 1, wherein the planarization layer is made of transparent organic material.

4. The substrate according to claim 3, wherein the transparent organic material includes acrylic.

5. The substrate according to claim 1, wherein the first, second and third color filter patterns are made of red, green and blue color resins, respectively.

6. The substrate according to claim 1, wherein a width of the at least one dummy pattern is thinner than that of the black matrix.

7. A fabricating method of a substrate for a liquid crystal display (LCD), comprising:
    forming a black matrix on a substrate having first, second, third and fourth sub-pixel regions, wherein the black matrix includes first, second, third and fourth openings corresponding to the first, second, third and fourth sub-pixel regions, respectively;

forming at least one dummy pattern in the fourth opening, wherein the at least one dummy pattern is made of the same material as the black matrix;

forming first, second and third color filter patterns corresponding to the first, second and third openings, respectively; and forming a planarization layer on the first, second and third color filter patterns, the planarization layer filling the fourth opening, wherein a total area of the dummy pattern is smaller than an area of the fourth opening excluding the dummy pattern.

8. The method according to claim 7, wherein a surface of the planarization layer corresponding to the fourth opening is substantially equal to a surface of the planarization layer corresponding to the first, second and third openings.

9. The method according to claim 7, wherein the planarization layer is made of transparent organic material.

10. The method according to claim 9, wherein the transparent organic material includes acrylic.

11. The method according to claim 7, wherein the first, second and third color filter patterns are made of red, green and blue color resins, respectively.

12. The method according to claim 7, wherein a width of the at least one dummy pattern is thinner than that of the black matrix.

* * * * *